(12) United States Patent
Oh et al.

(10) Patent No.: US 7,702,350 B2
(45) Date of Patent: Apr. 20, 2010

(54) FAST CONVERGING POWER CONTROL FOR WIRELESS COMMUNICATION SYSTEMS

(75) Inventors: Hyukjun Oh, Santa Clara, CA (US); Luca Blessent, San Diego, CA (US); Chih-Ping Hsu, San Diego, CA (US); Da-Shan Shiu, San Jose, CA (US); Nitin Kasturi, Los Gatos, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 825 days.

(21) Appl. No.: 10/387,973

(22) Filed: Mar. 12, 2003

(65) Prior Publication Data

US 2004/0137860 A1    Jul. 15, 2004

Related U.S. Application Data

(60) Provisional application No. 60/431,320, filed on Dec. 6, 2002.

(51) Int. Cl.
*H04B 7/00* (2006.01)
*H04B 1/00* (2006.01)
*H01Q 11/12* (2006.01)

(52) U.S. Cl. .................. 455/522; 455/69; 455/13.4; 455/127.1

(58) Field of Classification Search ............. 455/522, 455/69, 13.4, 127.1
See application file for complete search history.

(56) References Cited

U.S. PATENT DOCUMENTS

| 6,414,946 | B1 * | 7/2002 | Satou et al. ............... 455/522 |
| 6,622,024 | B2 * | 9/2003 | Koo et al. .................. 455/522 |
| 6,748,232 | B1 * | 6/2004 | Anderson et al. .......... 455/522 |
| 6,748,234 | B1 * | 6/2004 | Agrawal et al. ........... 455/522 |
| 6,754,505 | B1 * | 6/2004 | Baker et al. ............... 455/522 |
| 6,898,439 | B2 * | 5/2005 | Kayama et al. ............ 455/522 |
| 6,944,468 | B2 * | 9/2005 | Okumura ................... 455/522 |
| 2002/0165004 | A1 | 11/2002 | Chen et al. |
| 2004/0106425 | A1 * | 6/2004 | Koo et al. .................. 455/522 |
| 2005/0099957 | A1 * | 5/2005 | Soldani et al. ............. 455/522 |

FOREIGN PATENT DOCUMENTS

| WO | 0065748 | 11/2000 |
| WO | 1248388 | 10/2002 |

* cited by examiner

*Primary Examiner*—Matthew D Anderson
*Assistant Examiner*—Wen W Huang
(74) *Attorney, Agent, or Firm*—George C. Pappas; Eric Ho

(57) ABSTRACT

Techniques to quickly adjust an SIR target toward a final value needed to achieve a specified target BLER for a data transmission. The outer loop may be implemented with multiple modes. The SIR target may be maintained fixed in a hold mode, adjusted in large down steps to speed up convergence in an acquisition mode, and adjusted by a small down step and a large up step for good and erased blocks, respectively, in a tracking mode. Various schemes may be used to adjust the SIR target by larger down steps in the acquisition mode. These schemes may be used even if data is transmitted intermittently, the target BLER is set to a low value, and/or one or multiple transport channels are used for data transmission. The SIR target may be boosted by a particular amount upon transitioning from the acquisition mode to the tracking mode.

57 Claims, 7 Drawing Sheets

FAST CONVERGING POWER CONTROL FOR WIRELESS COMMUNICATION SYSTEMS

This application claims the benefit of provisional U.S. Application Ser. No. 60/431,320, entitled "FAST CONVERGING OUTER LOOP POWER CONTROL," filed Dec. 6, 2002, assigned to the assignee of the present application, and incorporated herein by reference in its entirety for all purposes.

BACKGROUND

1. Field

The present invention relates generally to communication, and more specifically to techniques for adjusting a signal quality (SIR) target used for power control in wireless communication systems.

2. Background

In a Code Division Multiple Access (CDMA) system, the total transmit power available for a base station is typically indicative of the total downlink capacity for that base station. This is because the base station may concurrently transmit data to multiple terminals on the same operating band at any given moment. On the downlink, a portion of the total transmit power may be allocated to each active terminal such that the aggregate transmit power used by the base station for all active terminals is less than or equal to the total transmit power.

To maximize downlink capacity, a power control mechanism is typically used to minimize power consumption and interference while maintaining a specified level of performance. This power control mechanism is typically implemented with two power control loops—an "inner" power control loop (or simply, the inner loop) and an "outer" power control loop (or simply, the outer loop). For a data transmission to a terminal, the inner loop adjusts the transmit power for the data transmission such that the received SIR for this data transmission at the terminal is maintained at a particular signal quality target, which may be given as a signal-to-interference ratio (SIR) target, an energy-per-bit-to-total-noise ratio (Eb/Nt) target, or some other measurement. SIR target is commonly used in W-CDMA, and Eb/Nt target is commonly used in IS-95 and IS-2000. For simplicity, the term "SIR target" generically refers to signal quality target in the following description. This SIR target is also often referred to as the power control setpoint. The outer loop adjusts the SIR target so as to maintain the specified level of performance, which may be quantified by a particular target block error rate (BLER), frame error rate (FER), packet error rate (PER), bit error rate (BER), or some other measure. BLER is commonly used in W-CDMA, and FER is commonly used in IS-95 and IS-2000. For simplicity, the term "BLER" generically refers to level of performance or quality of service (QoS) in the following description.

At the start of a communication session, the SIR target is normally set to an initial value that is often selected to be high enough to ensure reliable communication even for the worst-case scenario (i.e., the worst communication channel condition). The SIR target is then adjusted up or down as each block of data is received and decoded by the terminal. Conventionally, the SIR target is decreased by a small down step ($\Delta DN$) if a data block is decoded correctly and increased by a large up step ($\Delta UP$) if the data block is decoded in error. The ratio between the up step and down step is determined by the target BLER (e.g., $\Delta UP=99\cdot\Delta DN$ for a target BLER of 1%). Since the initial value for the SIR target is typically high (to ensure reliable communication) and since the down step is small, it typically takes the outer loop a prolonged period of time to adjust the SIR target to the final value needed to achieve the target BLER. During this period of time prior to convergence of the outer loop, excessive transmit power is used and downlink capacity is wasted. This problem is exacerbated if (1) the target BLER is a small value and the down step is correspondingly small, (2) data is transmitted intermittently instead of continuously, and/or (3) data is transmitted in bursts and the SIR target needs to be re-initialized for each burst.

There is therefore a need in the art for techniques to reduce the amount of time needed to adjust the SIR target to the final value.

SUMMARY

Techniques are provided herein to quickly adjust the SIR target toward the final value needed to achieve a specified target BLER for a data transmission. These techniques can provide faster rate of convergence for the SIR target even if data is transmitted intermittently, the target BLER is set to a low value, one or multiple transport channels are used for data transmission, and so on.

In one aspect, the outer loop is implemented with multiple modes, each of which may be defined to have certain beneficial characteristics for certain operating conditions. These modes may include, for example, a hold mode, an acquisition mode, and a tracking mode. In the hold mode, the SIR target may be maintained fixed or may be adjusted in small steps to prevent undesirable large changes to the SIR target due to any reason other than an inadequate received SIR (e.g., an unstable network at the beginning of a communication session). In the acquisition mode, the SIR target may be adjusted in large down steps to speed up convergence to the final value. In the tracking mode, the SIR target is decreased by a small down step for a good data block and increased by a large up step for an erased data block.

In another aspect, various schemes are provided for adjusting the SIR target to achieve faster convergence to the final value. In the acquisition mode, the SIR target may be (1) decreased by a larger down step than that used for the tracking mode and (2) increased by an up step that may be larger, the same, or possibly smaller than that used for the tracking mode. The up step may or may not be needed for the acquisition mode, depending on the exit condition used to transition from the acquisition mode to the tracking mode. Various schemes for adjusting the SIR target in the acquisition mode are described below.

In yet another aspect, the SIR target is boosted by a particular amount upon transitioning from the acquisition mode to the tracking mode. This boost may be used to ameliorate the small region with higher BLER following the rapid descent of the SIR target toward the final value. The expected amount of drop in the SIR target below the final value caused by the rapid descent of the SIR target in the acquisition mode may first be determined. The SIR target may then be boosted by this expected amount of drop (or a larger amount) upon transitioning to the tracking mode.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
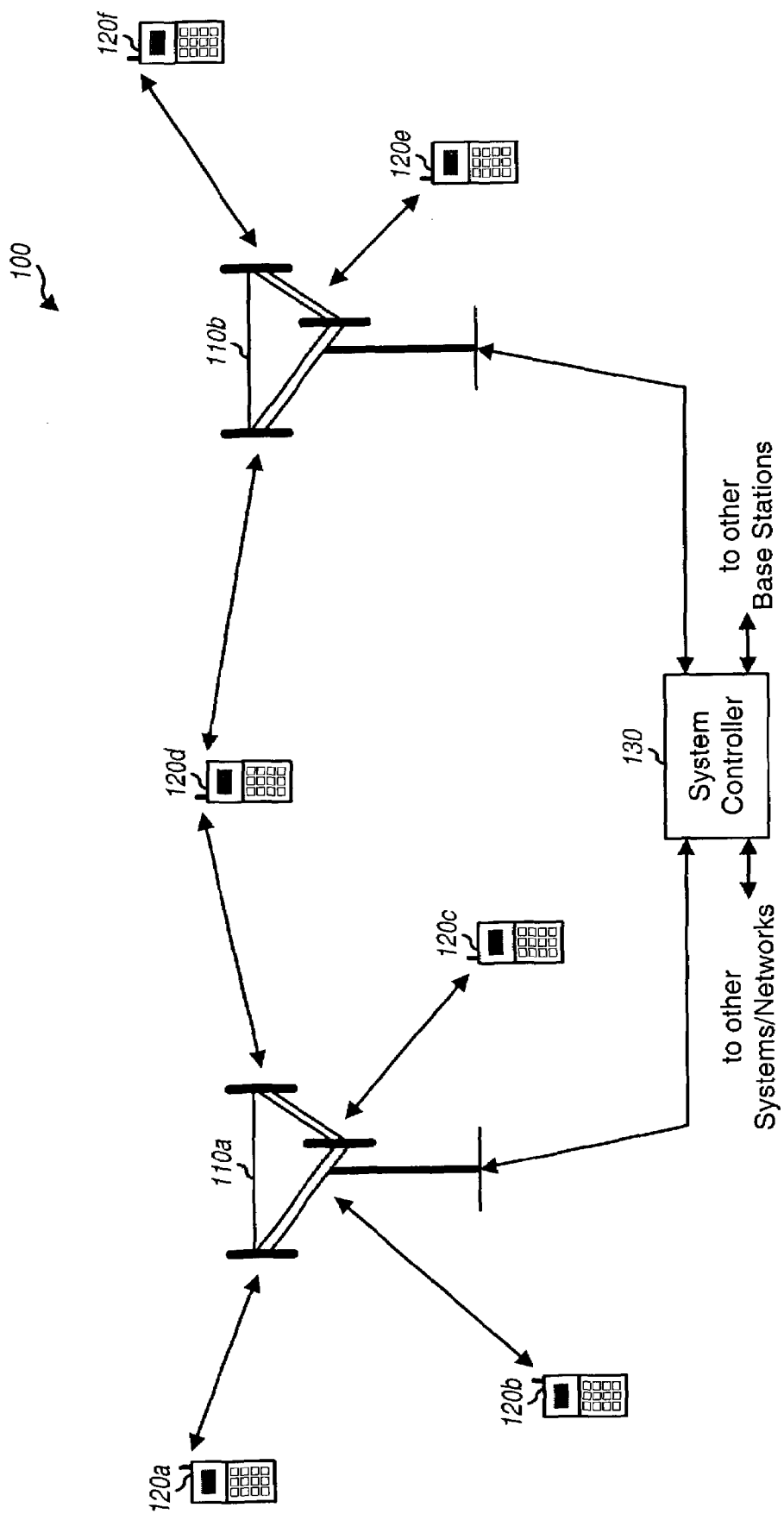
FIG. 1 shows an exemplary wireless communication system.

FIG. 1 shows an exemplary wireless communication system 100 with a number of base stations 110, each of which provides communication coverage for a respective geographic area. A base station is a fixed station and may also be referred to as a base transceiver subsystem (BTS), an access point, a Node B, or some other terminology. Various terminals 120 are typically dispersed throughout the system. A terminal may be fixed or mobile and may also be referred to as a remote station, a mobile station, an access terminal, a user equipment (UE), a wireless communication device, or some other terminology. A terminal may communicate with one or more base stations on the downlink (i.e., forward link) and/or one or more base stations on the uplink (i.e., reverse link) at any given moment. For simplicity, only two base stations and six terminals are shown in FIG. 1.

A system controller 130 couples to base stations 110 and may further couple to other systems and networks, such as a public switched telephone network (PSTN) and/or a packet data serving node (PDSN). System controller 130 provides coordination and control for the base stations coupled to it and further controls the routing of calls to/from the terminals served by these base stations. System controller 130 may also be referred to as a base station controller (BSC), a radio network controller (RNC), or some other terminology.

System 100 may be a CDMA system that may implement one or more CDMA standards such as W-CDMA, IS-2000, IS-856, and IS-95. System 100 may also be a time division multiple access (TDMA) system that may implement one or more TDMA standards such as GSM. These standards are well known in the art. For clarity, various aspects and embodiments are described below with reference to W-CDMA. However, the concepts described herein may be applicable to other CDMA systems and other types of wireless communication systems.

In W-CDMA, data to be transmitted to a particular terminal is processed as one or more "transport" channels at a higher signaling layer. A transport channel may be viewed as a data/message bearer. The transport channels commonly used for data transmission include a dedicated traffic channel (DTCH) and a dedicated control channel (DCCH). Each transport channel may be associated with one or more transport formats, each of which defines various processing parameters such as (1) the transmission time interval (TTI) over which the transport format applies, (2) the size of each transport block of data, (3) the number of transport blocks within each TTI, (4) the coding scheme to be used for the TTI, and so on. A TTI may span one, two, four, or eight 10-msec time periods. Each transport channel may further be associated with a respective SIR target that is dependent on (1) the target BLER specified for that transport channel, (2) the transport format used for the transport channel for the current TTI, and (3) possibly other factors. This flexibility allows different transport channels to achieve different quality of service (QoS). In W-CDMA, the transport channels used for data transmission are multiplexed together onto a single "physical" channel. The transmit power for the physical channel may be adjusted through power control. The DTCH and DCCH are described in 3GPP TS 25.301, which is publicly available.

For simplicity, the following generic terminology is used for the description below. A "data block" is a unit of data that may be of any size and includes information (e.g., a cyclic redundancy check (CRC) value) that may be used by a receiver to determine whether the data block was received correctly or in error. A data block is transmitted over a "frame", which is a time interval that may be of any duration. Different types of system may use other units of transmission instead of data block (e.g., packet) and other units of time instead of frame (e.g., slot).

Also for simplicity, "SIR" is used to denote signal quality and "BLER" is used to denote data transmission performance. Signal quality may be quantified by signal-to-noise ratio, signal-to-interference ratio, signal-to-noise-and-interference ratio, received signal strength, pilot strength, and so on. Data transmission performance may also be quantified by block error rate (BLER), frame error rate (FER), packet error rate (PER), bit error rate (BER), and so on.

The techniques for adjusting the SIR target described herein may be used for the downlink (i.e., forward link) as well as the uplink (i.e., reverse link). For clarity, these techniques are specifically described below for the downlink.

Figure 2:
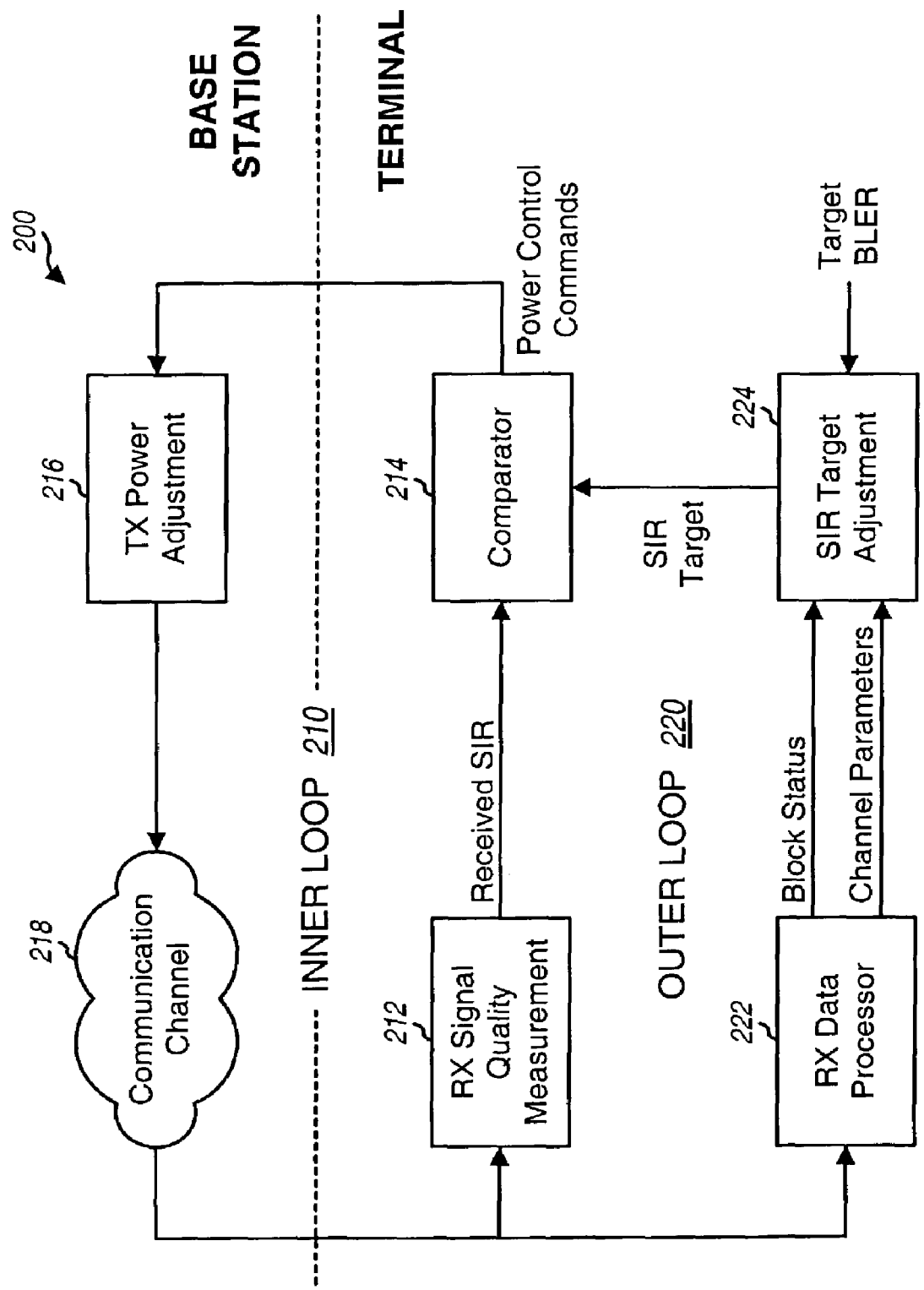
FIG. 2 shows a power control mechanism that may be used to control the transmit power of a downlink data transmission.

FIG. 2 shows a power control mechanism 200 that may be used to control the transmit power of a downlink data transmission sent on a physical channel to a terminal. Power control mechanism 200 includes an inner loop 210 that operates in conjunction with an outer loop 220.

Inner loop 210 is a relatively fast loop that attempts to maintain the received SIR for the data transmission as close as possible to the SIR target. The inner loop operations typically include (1) determining the received SIR for the data transmission at the terminal (block 212), (2) comparing the received SIR against the SIR target (block 214), and (3) sending power control (PC) information back to the transmitting base station. The received SIR is typically determined based on pilot symbols included in the data transmission. The PC information may be in the form of PC commands or bits, each of which may be either an "UP" command to request an increase in transmit power or a "DOWN" command to request a decrease in transmit power. The base station may adjust the transmit power for the data transmission accordingly (block 216) each time it receives the PC information. The PC information may be sent as often as 1500 times per second for W-CDMA and 800 times per second for IS-2000 and IS-95, thus providing a relatively fast response time for inner loop 210.

Due to path loss, fading, and possibly other phenomena in the communication channel (cloud 218), which typically varies over time and especially for a mobile terminal, the received SIR at the terminal continually fluctuates. Inner loop 210 attempts to maintain the received SIR at or near the SIR target in the presence of changes in the communication channel.

Outer loop 220 is a slower loop that continually adjusts the SIR target such that the target BLER is achieved for the data transmission. The SIR value needed to achieve the target BLER may change depending on the channel types and channel conditions. For example, for a given target BLER, different SIR targets may be needed for fast fading, slow fading, and additive white Gaussian noise (AWGN) channels.

The outer loop operations typically include (1) processing the received data transmission to recover transmitted data blocks, (2) determining the status of each received data block (block 222) as being decoded correctly or in error, and (3) adjusting the SIR target (block 224) based on the data block status (and possibly along with other information). If a data block is decoded correctly (i.e., a good data block), then the received SIR at the terminal is likely to be higher than necessary and the SIR target may be reduced. Conversely, if a data block is decoded in error (i.e., an erased data block), then the received SIR at the terminal is likely to be lower than necessary and the SIR target may be increased.

If the data transmission is sent on multiple transport channels that are carried on a single physical channel, then the outer loop may be operated to provide a final SIR target for power control of the physical channel. This final SIR target may be obtained in various manners. In one method, an SIR target is maintained for each transport channel and adjusted based on data blocks received for that transport channel to achieve the target BLER specified for the transport channel. The final SIR target for the physical channel is then determined based on the SIR targets for the transport channels. For example, the final SIR target may be set equal to the highest SIR target for all transport channels, which would then ensure that the target BLER or better will be achieved for all transport channels. The inner loop may then be operated to adjust the transmit power for the physical channel such that the final SIR target is met.

Conventionally, the outer loop is operated in a tracking mode whereby the SIR target is (1) decreased by a small down step if a good data block is received and (2) increased by a large up step if an erased data block is received. Assuming that one transport channel is used for data transmission, the down step and up step used for the tracking mode are typically dependent on the target BLER, and their relationship may be expressed as:

$$\Delta UP_{track} = \Delta DN_{track} \cdot \left( \frac{1 - BLER_{target}}{BLER_{target}} \right), \qquad \text{Eq (1)}$$

where $\Delta UP_{track}$ is the up step for the SIR target in the tracking mode;

$\Delta DN_{track}$ is the down step for the SIR target in the tracking mode; and $BLER_{target}$ is the target BLER for the data transmission being power controlled.

For example, for a target BLER of 1%, the up step is 99 times the size of the down step. If the up step is 0.5 dB, then the down step is approximately 0.005 dB.

As noted above, the initial value for the SIR target is often selected to be high enough to ensure reliable communication in the worst-case scenario. With a small down step, it normally takes a prolonged period of time for the outer loop to adjust the SIR target to the final value needed to achieve the target BLER. During this period of time, excessive transmit power is used and downlink capacity is wasted.

In an aspect, the outer loop may be implemented with multiple modes. Each mode may be defined to have certain beneficial characteristics for certain operating conditions. Table 1 lists some of the modes that may be used for the outer loop.

TABLE 1

| Outer Loop Mode | Description |
| --- | --- |
| Hold | The SIR target is maintained fixed or is adjusted in small steps to prevent large changes to the SIR target. |
| Acquisition | The SIR target is adjusted in large down steps to speed up convergence to the final value. |
| Tracking | The SIR target is decreased by a large down step for a good data block and increased by a large up step for an erased data block. |

In general, the outer loop may be implemented with any combination of the modes listed in Table 1 and/or other modes. For example, the outer loop may be implemented with all three modes, with only the acquisition and tracking modes, and so on.

Figure 3:
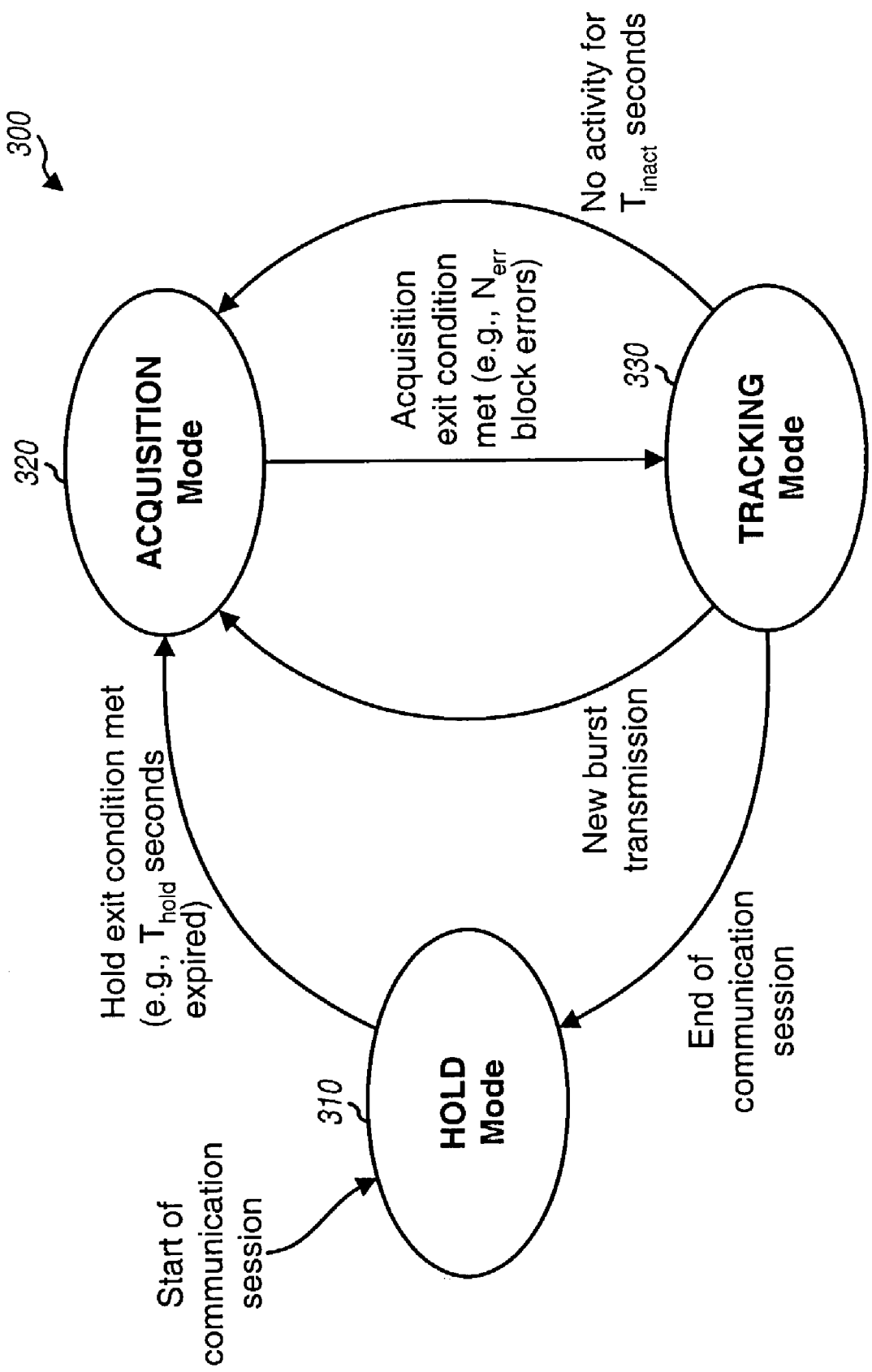
FIG. 3 shows an exemplary state diagram for an outer loop with a hold mode, an acquisition mode, and a tracking mode.

FIG. 3 shows an exemplary state diagram for an outer loop 300 with the three modes listed in Table 1. Initially, at the start of a communication session, the outer loop transitions to the hold mode 310.

In the hold mode, the initial value for the SIR target is determined and provided to the inner loop. This initial value may be a preselected value (e.g., a value determined by the system) or a dynamic value that is determined based on various considerations, as described below. In an embodiment, the SIR target is maintained fixed (i.e., not adjusted) while the outer loop is in the hold mode. This prevents undesired large changes to the SIR target due to block errors encountered for any reason other than an inadequate received SIR (e.g., an unstable system at the start of a call, a deep fade, and so on). The outer loop then transitions from the hold mode to the acquisition mode 320 upon meeting a hold exit condition, which in an embodiment is the expiration of $T_{hold}$ seconds, where $T_{hold}$ may be any value and may be dependent on the system.

In the acquisition mode, the SIR target is allowed to be adjusted in large down steps to speed up convergence to the final value. Various schemes may be used to adjust the SIR target in the acquisition mode, some of which are described below. The outer loop transitions from the acquisition mode to the tracking mode 330 upon meeting an acquisition exit condition, which in an embodiment is the occurrence of $N_{err}$ block errors, where $N_{err}$ may be any integer one or greater.

In the tracking mode, the SIR target is adjusted in the normal manner as shown in Table 1. Upon entering the tracking mode, the SIR target may be boosted by a particular amount to account for undershot in the SIR target due to a rapid descent to the final value during the acquisition mode, as described below. During the communication session, the outer loop may transition to the acquisition mode upon meeting certain conditions such as, for example, $T_{inact}$ seconds of inactivity. The outer loop may also transition to the hold mode upon termination of the communication session. The tracking mode may be implemented, for example, as described in U.S.

patent application Ser. No. 09/718,315, entitled "Method and Apparatus for Power Control in a Wireless Communication System," filed Nov. 21, 2000, assigned to the assignee of the present application and incorporated herein by reference.

Various details for the three modes are described below.

1. Hold Mode

The hold mode may be used to prevent large changes to the SIR target due to "abnormal" block errors that may be encountered at the start of a communication session. Abnormal block errors are those due to any reason other than an inadequate received SIR. If the SIR target is driven higher by these abnormal block errors, then it would take even longer to move the SIR target to the final value. Convergence of the outer loop would then be further prolonged. To prevent this, in the hold mode, the SIR target may be maintained fix or may be adjusted by a smaller up step than that used for the tracking mode. The duration of the hold mode (which is $T_{hold}$ seconds) may be selected to be as short as possible but still cover the time period when abnormal block errors are likely to occur.

2. Initial Value for Target SIR

The initial value for the SIR target may be a fixed value that may be configured at the terminal, provided by the system via overhead messages, or obtained in some other manner. The fixed value may be selected to ensure that the target BLER can be achieved even under the expected worst-case channel conditions.

The initial value for the SIR target may also be a dynamic value tint is determined based on various parameters for the data transmission. In general, the SIR value required to achieve a particular target BLER is dependent on various factors such as the channel conditions, the manner in which data is transmitted, the requirements for the data transmission, and so on. Some examples of parameters that may be used to determine the initial value for the SIR target include (1) the target BLER for the data transmission, (2) the slot format used for transmitting data, (3) the power offset between data symbols and pilot symbols, and (4) rate matching parameters.

The initial value may be selected based on the target BLER specified for the data transmission. A lower target BLER normally requires a higher SIR target, and vice versa.

The initial value may also be selected to take into account the slot format, which may indicate various parameters used for data transmission. Different parameter values may require different SIR to achieve the target BLER. For W-CDMA, the slot format indicates the numbers of data symbols, the numbers of dedicated pilot symbols, the numbers of power control bits to be transmitted in a 1.67 msec slot, the spreading factor to use for the data symbols, and so on. The spreading factor is related to data rate and has a large impact on the required SIR. The slot format for W-CDMA is described in detail in 3GPP TS 25.211.

The initial value may also be selected to take into account power offsets between different types of symbols. The received SIR is often estimated based on pilot symbols instead of data symbols. For W-CDMA, the dedicated pilot symbols, power control bits, and transport format combination indicator (TFCI) may be transmitted at different power levels relative to the power level of the data symbols. The offsets between these power levels, relative to the data power level, are configured by the system and provided to the terminal. If there is a difference between the transmit power used for the pilot symbols and the transmit power used for the data symbols, then the initial value may be set accordingly to account for this difference.

In general, a properly selected initial value for the SIR target can improve convergence speed for the outer loop, since the SIR target would need to be adjusted by a smaller amount to reach the final value. The fixed or dynamic value may thus be selected such that it deviates from the final value as little as possible while ensuring reliable communication.

3. Target SIR Adjustment Schemes for Acquisition Mode

In another aspect, various schemes are provided for adjusting the SIR target in the acquisition mode to achieve faster convergence to the final value. In the acquisition mode, the SIR target may be (1) decreased by a larger down step than that used for the tracking mode and (2) increased by an up step that may be larger, the same, or possibly smaller than that used for the tracking mode. Depending on the exit condition used to transition from the acquisition mode to the tracking mode, an up step may or may not be needed for the acquisition mode. For example, if the exit condition is one block error, then the up step is not needed.

Various schemes may be used for adjusting the SIR target in the acquisition mode, some of which are described below.

A. Large Down Step for Good Blocks

In a first adjustment scheme, the SIR target is decreased by a large down step $\Delta DN_{acq}$ for each good data block and increased by a large up step $\Delta UP_{acq}$ for each erased data block. The down step $\Delta DN_{acq}$ is selected to be larger than the down step $\Delta DN_{track}$ used for the tracking mode (i.e., $\Delta DN_{acq} > \Delta DN_{track}$). The up step $\Delta UP_{acq}$ may be larger than, equal to, or possibly smaller than the up step $\Delta UP_{track}$ used for the tracking mode.

In one embodiment, the down step $\Delta DN_{acq}$ is set equal to the up step $\Delta UP_{acq}$ (i.e., $\Delta DN_{acq} = \Delta UP_{acq}$). In another embodiment, the down step $\Delta DN_{acq}$ and the up step $\Delta UP_{acq}$ for the acquisition mode are both set equal to the up step $\Delta UP_{track}$ used for the tracking mode (i.e., $\Delta DN_{acq} = \Delta UP_{acq} = \Delta UP_{track}$).

B. Large Down Step for BLER Measurements

In a second adjustment scheme, the SIR target is decreased by a large down step $\Delta DN_{acq}$ based on BLER measurements instead of for individual data blocks. The BLER may be measured by counting the number of erased blocks received within a particular time duration (e.g., $T_{BLER}$ seconds) or within a particular number of received data blocks ($N_{BLER}$ blocks). Any suitable value may be used for $T_{BLER}$ and $N_{BLER}$. For example, $T_{BLER}$ may be selected to be within a range of two to four seconds. The number of erased blocks may optionally be divided by either $T_{BLER}$ seconds or $N_{BLER}$ blocks to obtain a BLER measurement.

The measured BLER may be compared against the target BLER. If the measured BLER is less than the target BLER, then the SIR target may be decreased by the large down step $\Delta DN_{acq}$. The outer loop may transition to the tracking mode lithe measured BLER exceeds the target BLER $N_{Berr}$ times, where $N_{Berr}$ may be any integer one or greater.

C. Multiple Stages with Different Large Down Steps

In a third adjustment scheme, the acquisition mode is divided into multiple stages, and a different set of down and up steps is used for each stage. The down and up steps for stage i may be respectively denoted as $\Delta DN_{acq,i}$ and $\Delta UP_{acq,i}$, for i=1, . . . S, where S is the number of stages. A successively smaller down step may be used for each subsequent stage such that $\Delta DN_{acq,1} > \ldots \Delta DN_{acq,i} > \ldots \Delta DN_{acq,S}$. The down steps used by all stages may be selected to be larger than the down step used for the tracking mode, i.e., $\Delta DN_{acq,i} > \Delta DN_{track}$, for i=1, . . . S. The same or different up steps may be used for the S stages. Moreover, the up step for each stage may be larger than, equal to, or possibly smaller than the up step used for the tracking mode.

In one embodiment, successively smaller down steps are used for the S stages (i.e., $\Delta DN_{acq,1} > \ldots \Delta DN_{acq,i} > \ldots$ $\Delta DN_{acq,S}$), and the same up step is used for all stages (i.e., $\Delta UP_{acq,i} = \Delta UP_{track}$ for i=1, ... S). The outer loop transitions from stage i to stage i+1 upon receiving $N_{Serr,i}$ block errors, where $N_{Serr,i}$ may be any integer one or greater. The outer loop would transition from the last stage of the acquisition mode to the tracking mode upon receiving $N_{Serr,S}$ block errors while in the last stage.

4. Target SIR Adjustment Schemes for Multiple Transport Channels

The outer loop may be designed to support multiple transport channels carried on one physical channel. In one embodiment, one SIR target is maintained for each transport channel and may be adjusted based on any of the adjustment schemes described above. The maintenance of a separate SIR target for each transport channel is also described in the aforementioned U.S. patent application Ser. No. 09/718,315. A final SIR target is then determined based on the SIR targets for the transport channels and used for power control of the physical channel. In another embodiment, a single overall SIR target may be maintained for all transport channels in the acquisition mode, as described below. Various schemes may thus be used to determine the final SIR target when multiple transport channels are carried on one physical channel. Some of these schemes are described below.

A. Limit on Final Target SIR

For improved efficiency, the target BLERs and transport formats for all transport channels carried by any given physical channel are typically selected such that the difference between their SIR targets is not too large. During normal operation in the tracking mode, the final SIR target is often selected such that the target BLER or better is achieved for each of the transport channels carried by the physical channel. This can be achieved by selecting the highest SIR target for all transport channels as the final SIR target.

The use of the highest SIR target for the final SIR target may be sub-optimal in the acquisition mode for several reasons. First, if a transport channel is transmitted intermittently, then its SIR target will likely be high and the final SIR target will likely be set to the SIR target of this transport channel. At the start of the acquisition mode, the SIR targets for all transport channels may be set to the initial values. The SIR target for an active transport channel would be adjusted lower quickly based on a larger number of data blocks received for this transport channel, whereas the SIR target for an intermittently transmitted transport channel may not be adjusted much from the initial value. Second, if more than an expected number of block errors occur for any one transport channel (e.g., due to an unstable network, a deep fade, and so on), then the SIR target for this transport channel would be adjusted high and would dominate the final SIR target.

In a fourth adjustment scheme, the SIR target for each of the transport channels carried by the same physical channel may be individually adjusted using a large down step in accordance with any one of the adjustment schemes described above, but an upper limit is imposed on the final SIR target. The limiting of the final SIR target may be achieved in various manners, some of which are described below.

In a first embodiment, the final SIR target is limited by the lowest SIR target of all transport channels carried by the physical channel. The final SIR target may then be selected as:

$$SIR\ target_{final} = \min\left(\min_k(SIR\ target_k) + SIR_{offset}, \max_k(SIR\ target_k)\right), \quad \text{Eq (2)}$$

where $SIR\ target_k$ is the SIR target for the k-th transport channel; and $SIR_{offset}$ is the SIR offset used to limit the final SIR target.

The first embodiment selects the highest SIR target for all of the transport channels as the final SIR target, but limits it to the lowest SIR target plus the SIR offset. Under normal operation, the SIR offset is typically not a large value because the SIR targets for the transport channels are normally selected to be small to maximize efficiency.

In a second embodiment, the final SIR target is limited by the average SIR target of multiple transport channels carried by the physical channel. The final SIR target may then be selected as:

$$SIR\ target_{final} = \min\left(avg_k(SIR\ target_k) + SIR_{offset}, \max_k(SIR\ target_k)\right). \quad \text{Eq (3)}$$

In equation (3), an average SIR target may be obtained for (a) the SIR targets for all transport channels, (b) all SIR targets except for the highest SIR target, or (c) some other combination of SIR targets. The second embodiment also selects the highest SIR target for all transport channels as the final SIR target, but limits it to the average SIR target plus the SIR offset.

For both embodiments, the SIR offset may be a fixed value or a dynamic value. The dynamic value may be determined based on pertinent parameters, similar to that described above for the initial value for the SIR target.

Other mechanisms for limiting the final SIR target may also be implemented, and this is within the scope of the invention. The limiting of the final SIR target may be applied just for the acquisition mode, or for both the acquisition and tracking modes.

B. Single Overall SIR Target for All Transport Channels

In a fifth adjustment scheme, a single overall SIR target is maintained by the outer loop for all transport channels (instead of a separate SIR target for each transport channel), and the transport channels contribute to the adjustment of this overall SIR target. The overall SIR target may be adjusted in various manners, some of which are described below.

In a first embodiment, for each "active" frame in which at least one data block is received on the transport channels, the overall SIR target is adjusted by a large down step $\Delta DN_{acq}$ if a good data block is received for any one of the transport channels. The outer loop would transition to the tracking mode if $N_{err}$ block errors are encountered for any transport channel. For example, if $N_{err}=1$, then for each active frame the overall SIR target is adjusted downward by the large step if a good data block is received for any transport channel. The outer loop would transition to the tracking mode if an erased data block is received for any transport channel. If $N_{err}>1$, then for each active frame the overall SIR target may be adjusted downward by the large step if a good block is received for any transport channel, even if an erased block is received for another transport channel. The outer loop would transition to the tracking mode if $N_{err}$ erased data blocks are received for any transport channel.

In a second embodiment, for each active frame, the overall SIR target is adjusted by the large down step $\Delta DN_{acq}$ only if good blocks are received for all transport channels or all active channels. The overall SIR target may be maintained at the same value or adjusted by a smaller down step if an erased data block is received for any one of the transport channels. Again, the outer loop may transition to the tracking mode if $N_{err}$ erased blocks are received for any transport channel.

Upon transitioning from the acquisition mode to the tracking mode, one SIR target may be maintained for each transport channel and may be initialized to the sum of (1) the last value for the overall SIR target at the time the outer loop exits from the acquisition mode and (2) an SIR offset. This SIR offset is typically not a large value for the reason noted above, and may even be set equal to zero. The SIR target for each transport channel may then be individually adjusted in the tracking mode.

C. Final Target SIR Based on Active Transport Channels

In a sixth adjustment scheme, the final SIR target is determined based only on the SIR targets of transport channels that are active. The transport channels carried by the physical channel may be operated intermittently, as described above. Not all of the transport channels may be active in any given frame. In this case, the SIR targets of only transport channels that are active are used to determine the final SIR target. The final SIR target may be selected, for example, as the highest SIR target among the active transport channels. The final SIR target may further be limited by an SIR offset, as described above.

For W-CDMA, the DTCH and DCCH are transport channels often used to transmit traffic data and control data, respectively, for a data transmission to a terminal. One or multiple DTCHs may be used for data transmission. For simplicity, the following description assumes that only one DTCH is used. The DTCH may be transmitted often (e.g., almost every frame) whereas the DCCH may be transmitted intermittently whenever control data needs to be sent. The DTCH and DCCH, which may be associated with TTIs of different lengths, are mapped to and carried by one physical channel.

For each DCCH TTI, a TFCI may be sent on the physical channel and used to indicate whether or not the DCCH is sent in that DCCH TTI. If the TFCI indicates that the DCCH is not transmitted in the DCCH TTI, then the outer loop may omit the DCCH from consideration.

Since the DCCH may be transmitted intermittently, there may be some frames in which it is not known whether or not the DCCH will be sent in the TTI. In a first embodiment, the DCCH is assumed to be transmitted, and a more conservative SIR target is used to avoid receiving the DCCH in error. Once it is ascertained that the DCCH is not transmitted in a DCCH TTI (after the TFCI has been received and processed), the DCCH may be removed from consideration by the outer loop until the next DCCH TTI. During this period of time, the final SIR target may be driven solely by the DTCH. In a second embodiment, the DCCH is assumed to be inactive, and the final SIR target may be driven solely by the DTCH. Once it is ascertained that the DCCH is transmitted in the DCCH TTI (after the TFCI has been received and processed), the DCCH may be considered by the outer loop until the next DCCH TTI. The first embodiment may provide better performance if the activity rate on the DCCH is high and/or correct detection of the DCCH is important. Conversely, the second embodiment may be better if the activity rate on the DCCH is low.

Alternatively, one overall SIR target may be maintained by the outer loop and this SIR target may be adjusted by all transport channels whenever data is received. The overall SIR target may be adjusted by the DCCH whenever data is received on the DCCH.

For the sixth adjustment scheme described above, the final SIR target is determined based only on the SIR targets of transport channels that are active (e.g., as determined based on the TFCI). The SIR target of each transport channel may be adjusted using the large down step $\Delta DN_{acq}$ in the acquisition mode and the small down step $\Delta DN_{track}$ in the tracking mode. Alternatively, the SIR target of each transport channel may be adjusted by the same down step $\Delta DN$ for both the acquisition and tracking modes.

D. Contribution to Final Target SIR

In a seventh adjustment scheme, the final or overall SIR target is decreased by a large down step only if a specified number of transport channels (e.g., all transport channels) are active.

E. Outer Loop for Multiple Transport Formats

In W-CDMA, each transport channel may be associated with one or more transport formats. Each transport format defines various processing parameters such as the TTI, the size of the transport block, the number of transport blocks within each TTI, the coding scheme to use for the TTI, and so on. Each transport format may be associated with a different code block length, which may in turn require a different SIR target to achieve the target BLER. (For W-CDMA, the code block length is determined by the transport block size, which is specified by the transport format.)

W-CDMA currently permits one target BLER to be specified for each transport channel, regardless of the number of transport formats selected for use for the transport channel. In this case, the outer loop may be operated to maintain an SIR target for each transport format of each transport channel. The SIR target for each transport channel may then be determined based on the SIR targets for all transport formats of that transport channel. The SIR target for the physical channel may then be determined based on the SIR targets for all transport channels, as described above. Maintenance of separate SIR targets for different transport formats is described in detail in U.S. Pat. No. 6,983,166, entitled "Power Control for a Channel With Multiple Formats in a Communication System", assigned to the assignee of the present application and incorporated herein by reference.

F. Other Schemes

A number of schemes have been described above for adjustment of the SIR target in the acquisition mode. Some of these schemes can provide faster rate of convergence of the SIR target to the final value even if (1) data is transmitted intermittently, (2) the target BLER is set to a low value, (3) there is only one active transport channel, and/or (4) there are multiple transport channels that may have the same or different SIR target requirements.

Various other SIR target adjustment schemes may also be implemented based on the general principle described above, and this is within the scope of the invention. Moreover, different combinations of these schemes may be implemented for the acquisition mode.

5. Outer Loop Design Performance

Figure 4A:
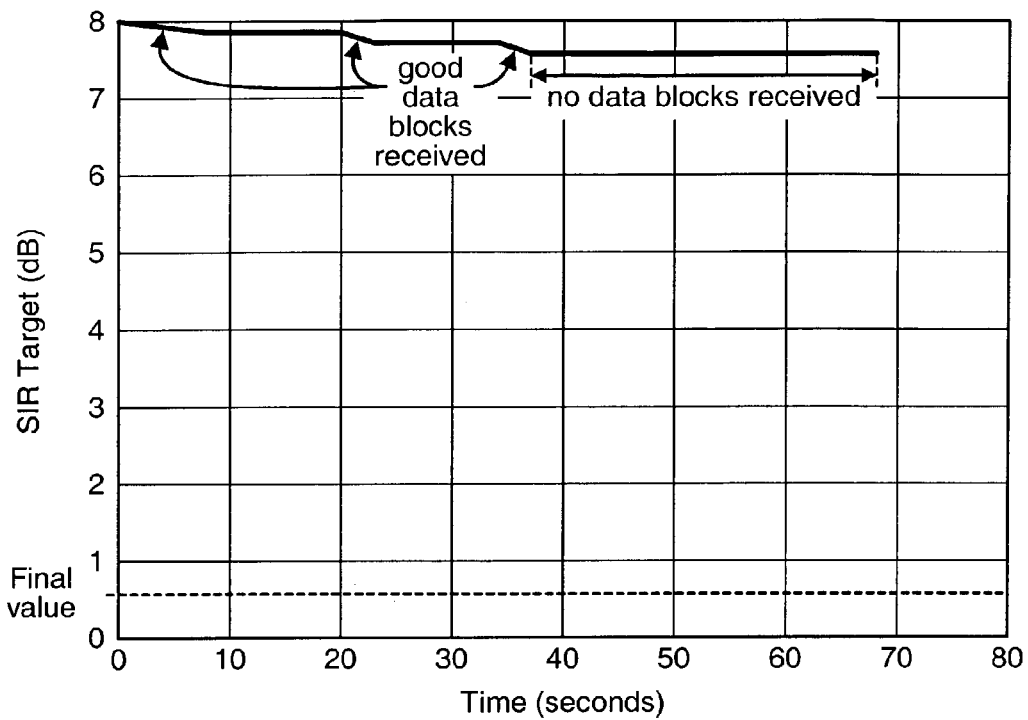
FIGS. 4A and 4B show the performance of an outer loop without the acquisition mode and an outer loop with the acquisition mode, respectively.

FIG. 4A shows the performance of a conventional outer loop without an acquisition mode for an exemplary data transmission on a physical channel. For this example, the up step for an erased data block is $\Delta UP=0.5$ dB, the down step for a good data block is $\Delta DN \approx 0.005$ dB, and the target BLER is 1%. If no data blocks are received, then the SIR target is not changed.

The physical channel may carry multiple transport channels, one or more of which may be intermittently transmitted as described above. If the outer loop considers all transport channels, then the final SIR target is likely to be determined by the SIR target of the intermittently transmitted transport channel. A prolonged period of inactivity on this transport channel (e.g., between 37 and 68 seconds in FIG. 4A) results in the final SIR target being far from the final value even after a long period of time has elapsed.

Figure 4B:
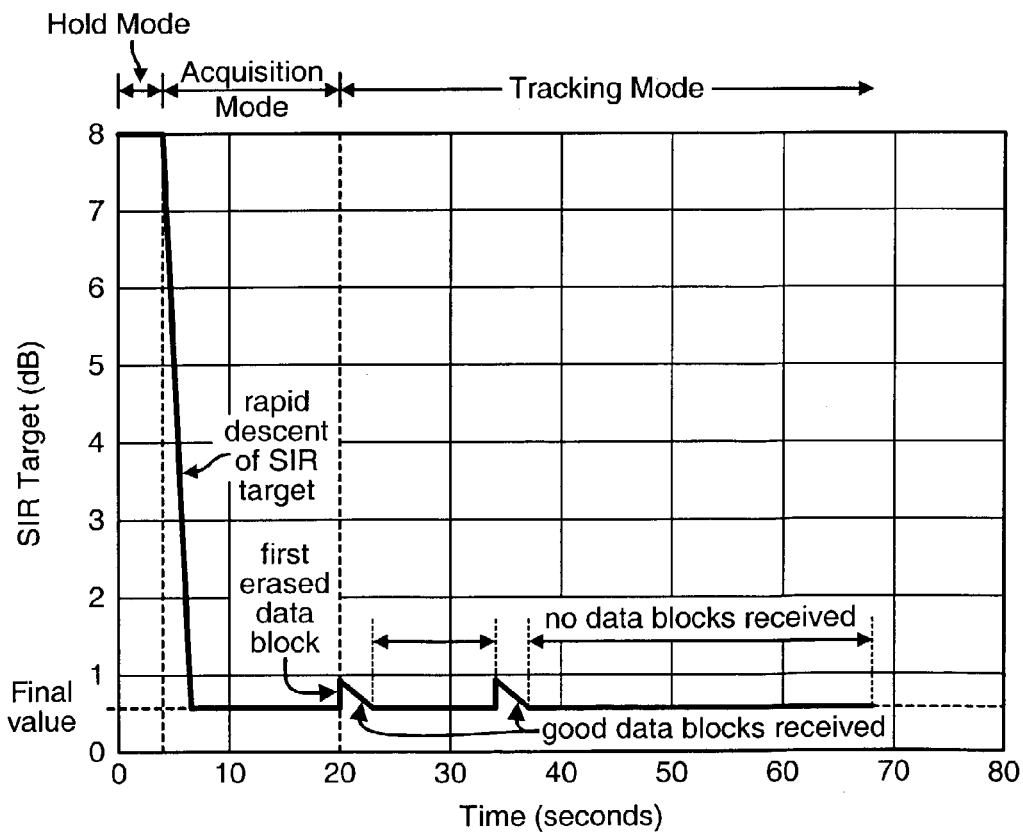

FIG. 4B shows the performance of an exemplary outer loop with the acquisition mode for the same exemplary data transmission used for FIG. 4A. Initially, the outer loop operates in the hold mode and the SIR target is fixed to prevent the outer loop from transitioning to the acquisition mode and then switching to the tracking mode (e.g., because of erased data blocks due to an unstable system at the start of a call, a deep fade, and so on). After the expiration of $T_{hold}$ seconds, the outer loop transitions to the acquisition mode.

In the acquisition mode, a large down step of $\Delta DN_{acq}$=0.5 dB is used to adjust the SIR target. The SIR target quickly reaches the final value because of the large down step. If multiple transport channels are carried by one physical channel, then the SIR target may be adjusted using any of the schemes described above. Upon receiving one erased data block (the exit condition for this example), the outer loop transitions to the tracking mode.

In the tracking mode, the outer loop decreases the SIR target by a small down step of $\Delta DN_{track}$=0.5·(BLER)/(1−BLER) dB for each good data block and increases the SIR target by an up step of $\Delta UP_{track}$=0.5 dB for each erased data block. If multiple transport channels are carried by one physical channel, then the outer loop can maintain a separate SIR target for each transport channel. The final SIR target may be selected based on the SIR targets for the transport channels (e.g., the highest SIR target for all transport channels). If an erased data block is received for any transport channel, then the SIR target for that transport channel is set to the final SIR target plus the up step.

6. Restarting Acquisition Mode

The outer loop may be operated to transition from the tracking mode to the acquisition mode upon occurrence of certain events. In one embodiment, the outer loop transitions to the acquisition mode after a specified period ($T_{inact}$ seconds) of inactivity while in the tracking mode. The channel conditions may have changed noticeably during this period of time, and improved performance may be achieved for the outer loop by returning to the acquisition mode after this period of inactivity. If multiple transport channels are carried by one physical channel, then the transition to the acquisition mode may occur if (1) any one of the transport channels is detected to be inactive for $T_{inact}$ seconds, or (2) all transport channels are inactive for this period of time. The outer loop may also be operated to transition back to the acquisition mode if some other conditions are met such as, for example, (1) if the average BLER for the past $T_{sec1}$ is not updated in the last $T_{sec2}$, (2) if the current SIR target is outside the normal range of values for the SIR target, or (3) the difference between the SIR targets for the DTCH and DCCH is greater than a particular threshold.

In some CDMA systems, a supplemental channel may be allocated to a terminal if needed and if resources are available. For example, in an IS-2000 system, a forward supplemental channel (F-SCH) may be allocated to a terminal for a particular period of time for downlink data transmission if needed and if resources are available. The supplemental channel may be a high-speed channel and may be used to provide additional data transmission capability whenever needed. Data transmission on the supplemental channel may be sporadic and bursty. In an embodiment, the outer loop may be operated to (1) transition to the acquisition mode at the start of each burst transmission on the supplemental channel and (2) reset the SIR target for the supplemental channel to the initial value at the start of each burst transmission. The initial value may be selected such that it is not too high (which would reduce capacity because a longer period of time would be needed to converge to the final value) or too low (which would degrade downlink throughput because a high block error rate would be encountered at the beginning of the burst transmission).

7. Target SIR Boost

The acquisition mode allows the outer loop to quickly adjust the SIR target toward the final value needed to achieve the target BLER. The condition used to detect such event may be the occurrence of $N_{err}$ block errors, where $N_{err}$ may be any integer (e.g., $N_{err}$=1). When the target BLER is relatively low (e.g., 5% or lower), which is typically the case, it can be shown that the SIR target is (on average) adjusted much lower than the final value before $N_{err}$ block errors are encountered. After that, some additional block errors are needed to cause the SIR target to be adjusted higher toward the final value. The $N_{err}$ block errors needed to cause the outer loop to transition out of the acquisition mode plus the additional block errors needed to adjust the SIR target back toward the final value (which may be viewed as "induced" block errors) are encountered each time the outer loop is operated in the acquisition mode.

If the data transmission is bursty and the outer loop is restarted in the acquisition mode for each burst transmission (which may be the case for the F-SCH in IS-2000), then the $N_{err}$ plus additional block errors introduce a floor in the BLER for the burst transmission, if the burst is not long enough to average out these block errors. Consequently, it may not be possible to achieve the target BLER for these burst transmissions.

Figure 5:
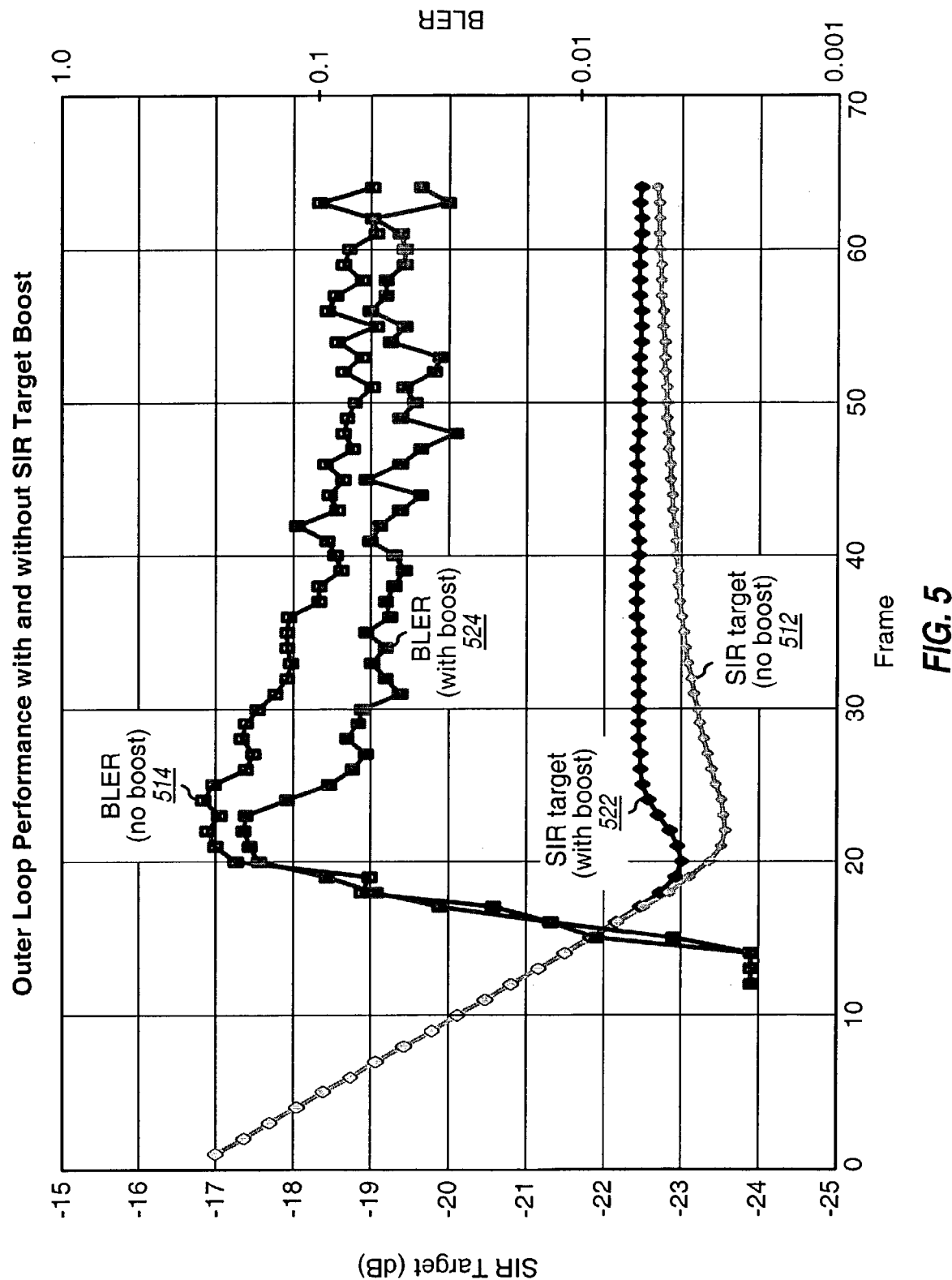
FIG. 5 shows the performance of an outer loop for a burst data transmission with and without a boost in the SIR target upon transitioning to the tracking mode.

FIG. 5 shows the performance of an exemplary outer loop for an exemplary burst data transmission. For this exemplary outer loop, the SIR target is set to an initial value of −17 dB, a large down step of $\Delta DN_{acq}$=0.34 dB is used for the acquisition mode, a down step of $\Delta DN_{track}$=0.0174 dB and an up step of $\Delta UP_{track}$=0.34 dB are used for the tracking mode, and the outer loop transitions from the acquisition mode to the tracking mode upon receiving one block error (i.e., $N_{err}$=1). The exemplary burst transmission includes 64 data blocks and has a target BLER of 5%.

Simulation was performed for a number of instances of the burst transmission over an AWGN channel. For each burst transmission, the SIR target and BLER are determined as each data block is received for the burst transmission. The SIR targets and BLERs for all simulated burst transmissions are then averaged and plotted in FIG. 5. The average SIR target for all simulated burst transmissions as a function of frame is shown by a plot 512, and the average BLER is shown by a plot 514. The average BLER for all simulated burst transmissions is 8.3%, which is higher than the target BLER of 5%.

In yet another aspect, the SIR target is boosted by a particular amount upon transitioning from the acquisition mode to the tracking mode. This boost may be used to ameliorate the small region with higher BLER following the rapid descent of the SIR target toward the final value. The boost for the SIR target may be expressed as:

$$SIR\ target_{track} = SIR\ target_{acq} + SIR_{boost}, \quad \text{Eq (4)}$$

where

SIR target$_{acq}$ is the SIR target provided by the outer loop upon transitioning to the tracking mode;

SIR$_{boost}$ is the amount of boost to the SIR target upon transitioning to the tracking mode; and SIR target$_{track}$ is the starting SIR target for the tracking mode.

The amount of boost for the SIR target, SIR$_{boost}$, may be determined in various manners (e.g., by simulation, empirical data from lab and/or field measurements, analysis, and so on). In an embodiment, the expected amount of drop in the SIR target below the final value (i.e., the expected amount of undershoot) caused by the rapid descent of the SIR target in the acquisition mode is first determined. The amount of boost, SIR$_{boost}$, may then be set equal to the expected undershoot. One exemplary scheme for determining the amount of boost is described below.

For this scheme, the SIR target is set to a particular initial value at the start of the acquisition mode and is thereafter decreased by the large down step for each frame until one erased data block is encountered (i.e., the exit condition for the acquisition mode). For each SIR target, the BLER is determined (e.g., based on simulation or empirical data). The frame in which the SIR target achieves the target BLER is determined and labeled as frame n$_{target}$. The frame in which the first erased block is expected to be encountered is also determined and labeled as frame n$_{exit}$. The values for n$_{exit}$ and n$_{target}$ are dependent on the initial value used for the SIR target, the down step size $\Delta DN_{acq}$, and the target BLER. The difference between n$_{exit}$ and n$_{target}$ then represents the number of additional frames that the SIR target is driven below the final value before the first erased block is encountered. The difference in the SIR targets at frames n$_{exit}$ and n$_{target}$ is then the expected amount of drop in the SIR target below the final value.

If the BLER is plotted versus SIR target, then it can be observed that the amount of drop in the SIR target below the final value is mainly a function of the shape of the curve in the high BLER region, and is almost independent of channel conditions. The SIR target can thus be boosted to compensate for this drop and to allow the average BLER to converge to the target BLER.

For clarity, the determination of the amount of SIR boost is described below for the exemplary outer loop and the exemplary burst transmission described above for FIG. 5. For the following analysis, X denotes a random variable for the frame in which the first erased block is encountered in a burst transmission, P(E|n) denotes the probability of an erased block being received in the n-th frame of the burst transmission, and P(X=n) denotes the probability of the first erased block being received in the n-th frame. The probability P(E|n) is a function of the SIR target used for the n-th frame and is also equal to the BLER for that SIR target.

Under the assumption of independent block errors (which is generally true for an AWGN channel and is an acceptable approximation for a fading channel), the following may be expressed:

$$P(X = n) = P(E \mid n) \cdot \prod_{j=1}^{n-1} (1 - P(E \mid j)). \quad \text{Eq (5)}$$

Equation (5) indicates that the probability of the first erased block occurring in the n-th frame of a burst transmission is equal to the product of (1) the probability of an erased block occurring in the n-th frame and (2) the probability of no erased block occurring in any of the prior n−1 frames.

At the start of the acquisition mode, the SIR target is set to the initial value. In the acquisition mode, the SIR target is driven successively lower from the initial value with the large down step $\Delta DN_{acq}$ by the outer loop for each frame until the first erased block is encountered. A set of probabilities for P(E|n) for different frames of the burst transmission may be determined by simulation or empirical data. A set of probabilities for P(X=n) for different frames may then be computed based on the set of probabilities for P(E|n), as shown in equation (5).

The expected value of X may then be expressed as:

$$E(X) = \sum_{n=1}^{\infty} n \cdot P(X = n). \quad \text{Eq (6)}$$

The expected value of X denotes the specific frame in which the first erased block is expected to occur, which is the exit condition that causes the outer loop to transition to the tracking mode. The value of E(X) is usually influenced to a large extent by the small number of high values for P(X=n).

The expected amount of undershoot may be determined by first computing the difference between the frame n$_{target}$ where the SIR target provides the target BLER and the expected value of X, E(X). This difference represents the number of additional frames that the SIR target is driven below the final value. If the SIR target is decreased by the large down step $\Delta DN_{acq}$ for each frame, then the expected amount of undershoot, SIR$_{drop}$, may be computed as:

$$SIR_{drop} = (E(X) - n_{target}) \cdot \Delta DN_{acq}. \quad \text{Eq (7)}$$

The amount of boost in the SIR target may then be set equal to the expected amount of undershoot, as follows:

$$SIR_{boost} = SIR_{drop}. \quad \text{Eq (8)}$$

The amount of boost may also be set higher than SIR$_{drop}$ to account for the fact that one erased block has just been received for the burst transmission. For example, the amount of boost may be set as: SIR$_{boost}$=SIR$_{drop}$+$\Delta UP_{track}$.

For clarity, the computation for the SIR boost is now described for a specific example based on the exemplary outer loop and the exemplary burst transmission described above. Table 2 lists an exemplary set of probabilities for P(E|n) and a set of probabilities for P(X=n), which is determined from the probabilities for P(E|n).

TABLE 2

| n | P(E\|n) | P(X = n) |
|---|---------|----------|
| 1 | 0.00800 | 0.00800  |
| 2 | 0.01700 | 0.01686  |
| 3 | 0.03500 | 0.03413  |
| 4 | 0.06500 | 0.06117  |

TABLE 2-continued

| n | P(E\|n) | P(X = n) |
|---|---------|----------|
| 5 | 0.12000 | 0.10558 |
| 6 | 0.20000 | 0.15485 |
| 7 | 0.28000 | 0.17343 |
| 8 | 0.38000 | 0.16947 |
| 9 | 0.49000 | 0.13549 |
| 10 | 0.60000 | 0.08461 |
| 11 | 0.70000 | 0.03948 |
| 12 | 0.90000 | 0.01523 |
| 13 | 0.99000 | 0.00168 |

Figure 6A:
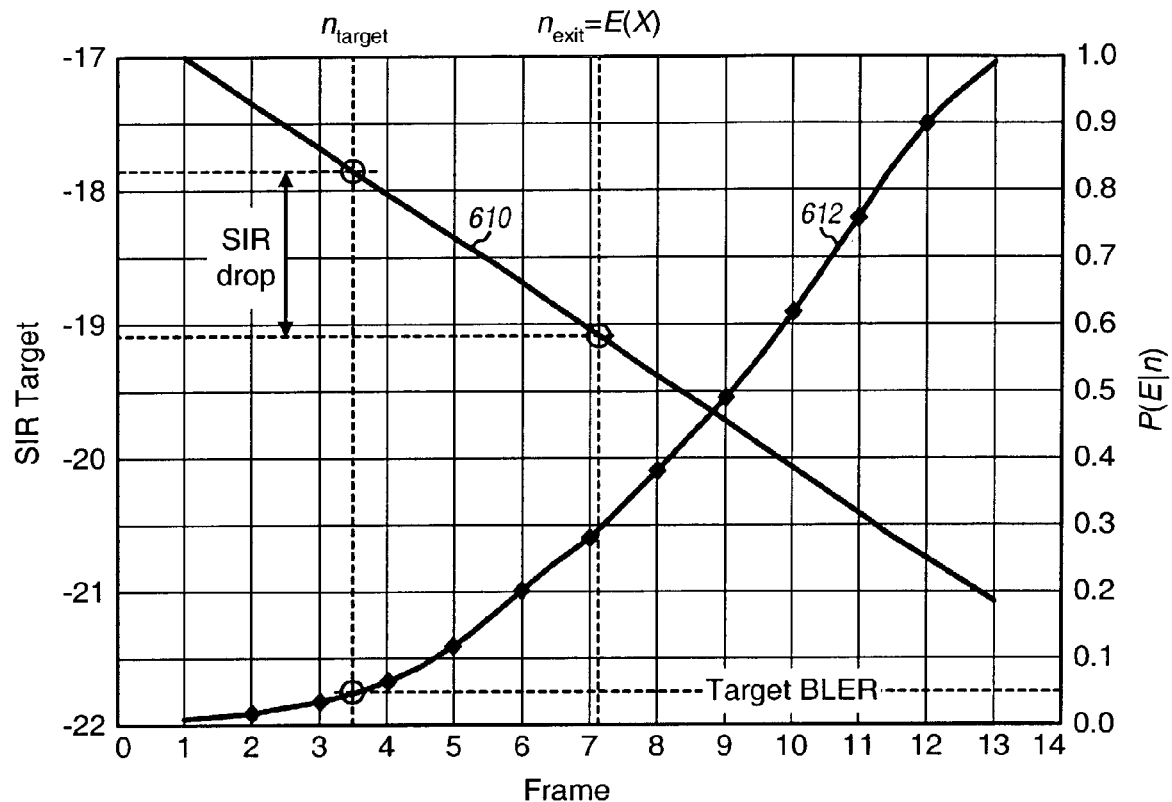
FIG. 6A shows a plot for SIR target versus frame and a plot for probability P(E|n) of receiving an erased block versus frame for a burst transmission.

FIG. 6A shows a plot 610 of SIR target versus frame n and a plot 612 of the probability P(E|n) versus frame n for the values shown in Table 2. At the start of a burst transmission, the SIR target is set to an initial value corresponding to a BLER of less than 0.8% and is thereafter decreased by the large down step $\Delta DN_{acq}$ for each good block. The n-th frame is thus associated with an SIR target$_n$, which may be given as:

$$SIR\ target_n = SIR\ target_{n-1} - \Delta DN_{acq}, \qquad Eq\ (9)$$

SIR target$_1$ is equal to the initial value.

For each frame n, the probability P(E|n) can be determined as the probability of receiving an erased block for the SIR target$_n$, which is also the BlER for this SIR target. The BLER of 5% occurs for $n_{target} \cong 3.5$. It can be observed from plots 610 and 612 that P(E|n) increases as the SIR target decreases.

Figure 6B:
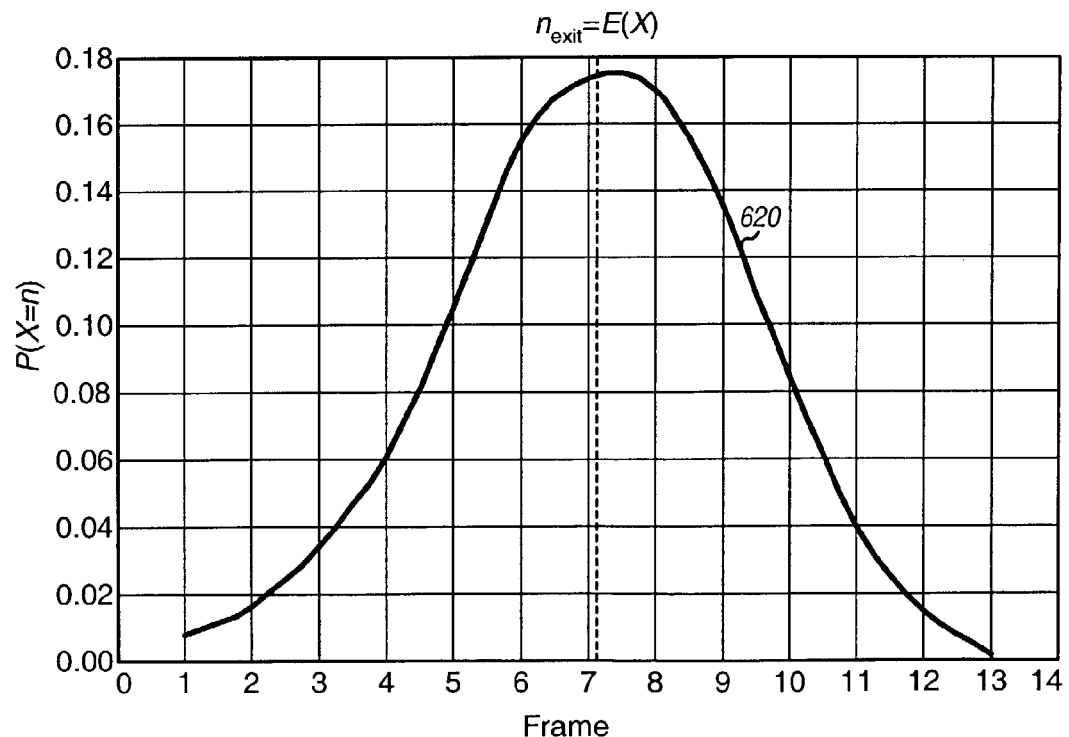
FIG. 6B shows a plot for the probability P(X=n) of receiving a first erased block versus frame.

FIG. 6B shows a plot 620 of the probability P(X=n) versus frame n. The value of E(X) can be computed based on the set of probabilities for P(X=n) shown in Table 2 and using equation (6) to obtain E(X)=$n_{exit}$=7.12. This indicates that, on average, the SIR target is driven below the final value by the rapid descent and to an SIR value corresponding to a BLER of approximately 30%, which is much higher than the target BLER of 5%. The difference in the values for $n_{exit}$ for FIG. 5 and FIG. 6B is due to the use of different initial values for the SIR target.

The expected amount of undershoot below the final value can be computed as:

$$SIR_{drop} = (7.12 - 3.5) \cdot 0.34 = 1.23\ dB. \qquad Eq\ (10)$$

The amount of boost in the SIR target may be set approximately equal to (1) the expected amount of undershoot, i.e., $SIR_{boost} \approx 1.23$ dB, or (2) the expected amount of undershoot plus the up step for the tracking mode, i.e., $SIR_{boost} \approx 1.57$ dB.

In general, the amount of boost may be determined by (1) the SIR target expected to be provided by the outer loop upon transitioning to the tracking mode, and (2) the SIR value needed to achieve the target BLER. The description above assumes that only one block error is required to cause the outer loop to transition from the acquisition mode to the tracking mode. Similar computation may be performed if the exit condition to transition to the tracking mode is multiple erased blocks or the occurrence of some other event.

FIG. 5 also shows the performance of the exemplary outer loop for the exemplary burst data transmission described above, with the boost for SIR target applied. Again, simulation was performed for a number of instances of the exemplary burst transmission over the AWGN channel. For each burst transmission, the outer loop is operated in the acquisition mode until the first erased block is received, at which time the outer loop transitions to the tracking mode and a boost of 1.23 dB is applied to the SIR target. The average SIR target for the burst transmission is shown by a plot 522 as a function of frame n, and the average BLER is shown by a plot 524. Plot 524 shows that when the boost is applied to the SIR target, the average undershoot in the SIR target with respect to the final value is reduced. This allows the average BLER to converge to the target BLER (which is 5% for this example) while maintaining the benefit of the initial rapid descent. Without the boost, the average BLER is greater than 8% as noted above.

The above analysis was performed for the AWGN channel. Similar outer loop performance may be achieved for other types of communication channel (e.g., a fading channel) if their BLER versus SIR target curves have similar shape as the one for the AWGN channel, particularly in the region above 10% BLER. The curves for other types of channel tend to be similar in shape but shifted along the horizontal axis representing SIR target.

If multiple transport channels are carried on one physical channel, then the boost may be applied to the final SIR target when the outer loop transitions to the tracking mode. The SIR boost may be combined with any of the adjustment schemes described above for the acquisition mode. Alternatively, the SIR boost may be omitted.

8. Network-Assisted Outer Loop

Further improvement in outer loop performance may be attained with assistance from the base station, which has control over how data is transmitted on the downlink. Several mechanisms for improving outer loop performance are described below.

In one embodiment, a CRC value is transmitted on each transport channel for each frame, even if the transport channel is inactive. For an inactive transport channel, a CRC value may be generated based on a null data block and transmitted. This CRC value may be used by a terminal to determine whether or not the final SIR target is sufficient for this transport channel.

In another embodiment, the transport channel that requires the largest fraction of the transmit power is the one that has the most influence on the final SIR target. This may be achieved by ensuring that the transport channel that requires the most transmit power is the one with the highest required SIR.

In yet another embodiment, the transport channel that is the most active is the one that has the most influence on the final SIR target. For example, if the DTCH is transmitted continually and the DCCH is transmitted intermittently, then the DCCH may be transmitted such that its required SIR is lower than the required SIR for the DTCH. In this way, the final SIR target is largely influenced by the more active DTCH and its required SIR.

9. System

Figure 7:
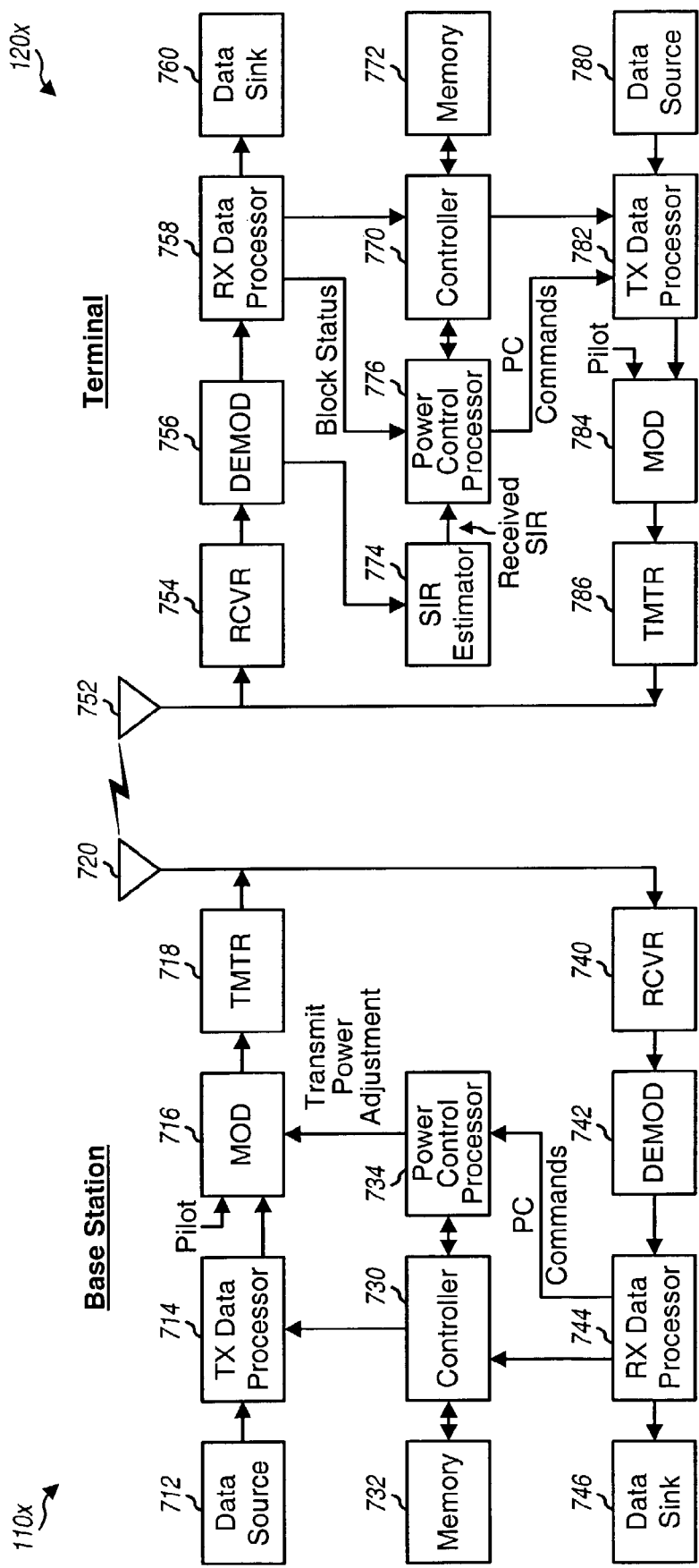
FIG. 7 shows a block diagram of a base station and a terminal.

FIG. 7 shows a block diagram of an embodiment of a base station 110x and a terminal 120x. On the downlink, a data source 712 and/or a controller 730 provide traffic and control data to be sent on one or more transport channels to a particular terminal. A transmit (TX) data processor 714 receives and processes this data in accordance with the transport format selected for each transport channel to provide data symbols. A modulator (MOD) 716 receives the data symbols and pilot symbols and further processes (e.g., channelizes and spectrally spreads) these symbols to provide processed data. Each data/pilot symbol is a modulation symbol generated based on a particular modulation scheme (e.g., BPSK, QPSK, M-QAM, and so on). The processed data is then conditioned (e.g., converted to one or more analog signals, amplified, filtered, and frequency upconverted) by a transmitter unit (TMTR) 718 to generate a downlink signal, which is then transmitted via an antenna 720 to the terminal.

At terminal 120x, the downlink signal is received by an antenna 752 and provided to a receiver unit (RCVR) 754, which conditions (e.g., filters, amplifies, frequency downconverts, and digitizes) the received signal to provide data samples. A demodulator (DEMOD) 756 then processes (e.g., spectrally despreads, channelizes, and data demodulates) the data samples to provide symbol estimates. Demodulator 756 may implement a rake receiver that can process multiple signal instances in the received signal and provide final symbol estimates. A receive (RX) data processor 758 then decodes the symbol estimates for each transport channel, checks each received data block, and provides decoded data and the status for each received data block (e.g., good or erased).

For the downlink power control, demodulator 756 processes the data samples and provides pilot symbol estimates to an SIR estimator 774, which can estimate the received SIR for the downlink data transmission based on the pilot symbol estimates. The SIR estimation may be performed as described in U.S. Pat. Nos. 6,097,972, 5,903,554, 5,056,109, and 5,265,119. The received SIR measurements are then provided to a power control processor 776, which compares the received SIR against the SIR target and provides the appropriate power control information, which may be in the form of PC commands or bits.

Power control processor 776 also receives the status of the received data blocks from RX data processor 758 and possibly other metrics (e.g., re-encoded symbol error rate). Power control processor 776 may also receive the target BLER for each transport channel, the down and up steps for the acquisition and tracking modes, and so on. Power control processor 776 then updates the SIR targets for the transport channels based on the status of the received data blocks and further determines the final SIR target to use for the inner loop. Power control processor 776 may implement any combination of the modes in Table 1 and any of the SIR adjustment schemes described above for the acquisition mode. Power control processor 776 may further compute and apply an SIR boost to the final SIR target upon transitioning to the tracking mode.

On the uplink, data from a data source 780 and/or controller 770 and power control information from power control processor 776 are processed by a TX data processor 782, further processed by a modulator 784, and conditioned by a transmitter unit 786 to provide an uplink signal. The uplink signal is then transmitted via antenna 752 to one or more base stations.

At base station 110x, the uplink signal is received by antenna 720, conditioned by a receiver unit 740, and processed by a demodulator 742 and an RX data processor 744 to recover the transmitted data and power control information. A power control processor 734 receives the power control information (e.g., PC commands) and generates the proper control to adjust the transmit power for the downlink data transmission to terminal 120x.

Controllers 730 and 770 control the operation of various processing units within base station 110x and terminal 120x, respectively. Memory units 732 and 772 may be used to store data and program codes used by controllers 730 and 770, respectively, and possibly other processing units within the base station and terminal, respectively.

For clarity, various details of the techniques for adjusting the SIR target have been described with reference to the downlink in W-CDMA. In general, these techniques may be used for various types of wireless communication systems that utilize power control for data transmission. For example, these techniques may be used for CDMA systems that implement W-CDMA, IS-2000, IS-95, and so on. These techniques may also be used for uplink transmission as well as downlink transmission.

The techniques described herein to adjust the SIR target may be implemented by various means. For example, these techniques may be implemented in hardware, software, or a combination thereof. For a hardware implementation, the elements used to implement the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 772 in FIG. 7) and executed by a processor (e.g., controller 770 or power control processor 776). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device in a wireless communication system, comprising:
 a power control processor operative to adjust a signal quality (SIR) target, used for power control of a data transmission, based on status of data blocks received for the data transmission, to adjust the SIR target using a first mode at beginning of the data transmission, to transition from the first mode to a second mode when an exit condition is encountered, to adjust the SIR target using only the second mode for remainder of the data transmission, to adjust the SIR target with a first down step and a first up step in the first mode and with a second down step and a second up step in the second mode, the first down step being larger than the second down step, the second down step and the second up step being determined based on a target block error rate (BLER) for the data transmission, to adjust the SIR target based on cyclic redundancy check (CRC) of the received data blocks in both the first and second modes, and to adjust the SIR target by the second up step for erased data blocks and by the second down step for good data blocks in the second mode.

2. The device of claim 1, further comprising:
 an SIR estimator operative to receive and process the data transmission to provide SIR estimates for the data transmission.

3. The device of claim 1, further comprising:
 a data processor operative to process the data transmission to determine the status of the data blocks received for the data transmission.

4. The device of claim 1, wherein the SIR target is adjusted using only the first mode until the exit condition is encountered and is thereafter adjusted using only the second mode for the remainder of the data transmission.

5. The device of claim 4, wherein the exit condition for the first mode is one data block received in error.

6. The device of claim 1, wherein the power control processor is further operative to start in a third mode at the beginning of the data transmission and to transition from the third mode to the first mode.

7. The device of claim 6, wherein the SIR target is maintained fixed while in the third mode.

8. The device of claim 6, wherein the power control processor is operative to remain in the third mode for a particular time duration and thereafter transition to the first mode.

9. The device of claim 1, wherein while in the first mode the SIR target is adjusted by the first down step for each data block received correctly.

10. The device of claim 1, wherein the first down step is equal to the first up step.

11. The device of claim 1, wherein while in the first mode the SIR target is adjusted by the first down step for each BLER measurement not exceeding the target BLER for the data transmission.

12. The device of claim 1, wherein the first mock includes at least two stages, each stage being associated with a respective down step that is larger than the second down step and different from down steps of other ones of the at least two stages.

13. The device of claim 12, wherein the power control processor is operative to transition through the at least two stages, one stage at a time, from a first stage associated with a largest down step to a last stage associated with a smallest down step.

14. The device of claim 1, wherein the SIR target is set to an initial value at the start of the first mode, and wherein the initial value is determined based on at least one parameter value for the data transmission.

15. The device of claim 14, wherein the at least one parameter value is indicative of the target BLER for the data transmission, a format used for the data transmission, a power offset between data symbols and pilot symbols sent in the data transmission, or a combination thereof.

16. The device of claim 1, wherein the power control processor is operative to increase the SIR target by a particular amount upon transitioning from the first mode to the second mode.

17. The device of claim 16, wherein the particular amount is determined based on an expected difference between an SIR value needed to achieve the target BLER for the data transmission and the SIR target at the time of transition from the first mode to the second mode.

18. The device of claim 1, wherein the wireless communication system as a W-CDMA system.

19. The device of claim 1, wherein the wireless communication system is an IS-2000 system.

20. A device in a wireless communication system, comprising:
a power control processor operative to adjust a final signal quality (SIR) target, used for power control of a data transmission received via a plurality of transport channels, based on status of data blocks received on the plurality of transport channels for the data transmission, to maintain a separate SIR target for each of the plurality of transport channels, to determine the final SIR target based on SIR targets for the plurality of transport channels, to adjust the SIR target for each transport channel using a first mode at beginning of the data transmission, to transition from the first mode to a second mode when an exit condition is encountered, to adjust the SIR target for each transport channel using only the second mode for remainder of the data transmission, to adjust the SIR target for each transport channel with a first down step in the first mode and with a second down step in the second mode, the first down step being larger than the second down step, and to adjust the SIR targets for the plurality of transport channels by an up step for erased data blocks and by the second down step for good data blacks in the second mode.

21. The device of claim 20, wherein the final SIR target is set to a highest SIR target among the SIR targets for the plurality of transport channels, and wherein the final SIR target is further limited to a value equal to a lowest SIR target among the SIR targets for the plurality of transport channels plus a particular SIR offset.

22. A device operable to adjust a signal quality (SIR) target used for power control of a data transmission in a CDMA communication system, comprising:
a data processor operative to process the data transmission to determine status of data blocks received for the data transmission; and
a power control processor operative to adjust the SIR target based on the status of received darn blocks, to adjust the SIR target using a first mode at beginning of the data transmission, to transition from the first mode to a second mode when an exit condition is encountered, to adjust the SIR target using only the second mode for remainder of the data transmission, to adjust the SIR target with a first down step and a first up step in the first mode and with a second down step and a second up step in the second mode, the first down step being larger than the second down step, the second down step and the second up step being determined based on a target block error rate (BLER) for die data transmission, to adjust the SIR target based on cyclic redundancy check (CRC) of the received data blocks in both the first and second modes, and to adjust the SIR target by the second up step for erased data blocks and by the second down step for good data blocks in the second mode.

23. An integrated circuit comprising:
a power control processor operative to adjust a signal quality (SIR) target, used for power control of a data transmission, based on status of data blocks received for the data transmission, to adjust the SIR target using a first mode at beginning of the data transmission, to transition from the first mode to a second mode when an exit condition is encountered, to adjust the SIR target using only the second mode for remainder of the data transmission, to adjust the SIR target with a first down step and a first up step in the first mode and with a second down step and a second up step in the second mode, the first down step being larger than the second down step, the second down step and the second up step being determined based on a target block error rate (BLER) for the data transmission, to adjust the SIR target based on cyclic redundancy check (CRC) of the received data blocks in both the first and second modes, and to adjust the SIR target by the second up step for erased data blocks and by the second down step for good data blocks in the second mode.

24. The integrated circuit of claim 23, wherein the power control processor is further operative to maintain the SIR target fixed in a third mode.

25. The integrated circuit of claim 23, wherein the power control processor is operative to transition from the first mode to the second mode upon receiving a particular number of data blocks in error.

26. The integrated circuit of claim 23, wherein the data transmission is received via a plurality of transport channels, and wherein a single SIR target is maintained for all of the transport channels while in the first mode.

27. An apparatus in a wireless communication system, comprising:
 means for adjusting a signal quality (SIR) target using a first mode at beginning of a data transmission, wherein the SIR target is used for power control of the data transmission and is adjusted based on status of data blocks received for the data transmission;
 means for transitioning from the first mode to a second mode upon encountering an exit condition; and
 means for adjusting the SIR target using only the second mode for remainder of the data transmission, wherein the SIR target is adjusted with a first down step and a first up step in the first mode and with a second down step and a second up step in the second mode, the first down step being larger than the second down step, the second down step and the second up step being determined based on a target block error rate (BLER) for the data transmission, the SIR target being adjusted based on cyclic redundancy cheek (CRC) of the received data blocks in both the first and second modes, and the SIR target being adjusted by the second up step for erased data blocks and by the second down step for good data blocks in the second mode.

28. The apparatus of claim 27, wherein die data transmission is received via a plurality of transport channels, and wherein a single SIR target is maintained for all of the transport channels while in the first mode.

29. The apparatus of claim 27, further comprising:
 means for starting in a third mode at beginning of the data transmission; and
 means for transitioning from the third mode to the first mode.

30. The apparatus of claim 29, further comprising:
 means for maintaining the SIR target fixed while in the third node.

31. The apparatus of claim 27, further comprising:
 means for determining an initial value based on at least one parameter value for the data transmission; and
 means for setting the SIR target to the initial value at start of the first mode.

32. The apparatus of claim 27, wherein the exit condition for the first mode is a particular number of data blocks received in error.

33. The apparatus of claim 27, wherein the first mode includes at least two stages, each stage being associated with a respective down step that is larger than the second down step and different from down steps of other ones of the at least two stages.

34. The apparatus of claim 33, wherein the means for transitioning from the first mode to the second mode comprises
 means for transitioning through the at least two stages in the first mode, one stage at a time, from a first stage associated with a largest down step to a last stage associated with a smallest down step.

35. The apparatus of claim 27, further comprising:
 means for increasing the SIR target by a particular amount upon transitioning from the first mode to the second mode.

36. The apparatus of claim 35, further comprising:
 means for determining the particular amount based on an expected difference between an SIR value needed to achieve the target BLER for the data transmission and the SIR target at the time of transition from the first mode to the second mode.

37. The apparatus of claim 27, further comprising:
 means for receiving the data transmission via a plurality of transport channels.

38. The apparatus of claim 37, wherein the means for adjusting the SIR target using the first mode comprises
 means for maintaining a single SIR target for all of the transport channels while in the first mode.

39. The apparatus of claim 37, wherein the means for adjusting the SIR target using the second mode comprises
 means for maintaining a separate SIR target for each of the plurality of transport channels in the second mode, and
 means for determining the SIR target used for power control of the data transmission based on separate SIR targets for the plurality of transport channels.

40. The apparatus of claim 39, wherein the SIR target used for power control of the data transmission is set to a highest SIR target among the separate SIR targets for the plurality of transport channels.

41. The apparatus of claim 39, wherein the SIR target used for power control of the data transmission is limited to a value equal to a lowest SIR target among the separate SIR targets for the plurality of transport channels plus a particular SIR offset.

42. A method of adjusting a signal quality (SIR) target used for power control of a data transmission in a wireless communication system, comprising:
 adjusting the SIR target using a first mode at beginning of the data transmission, wherein the SIR target is adjusted based on status of data blocks received for die data transmission;
 transitioning from the first mode to a second mode upon encountering an exit condition; and
 adjusting the SIR target using only the second mode for remainder of the data transmission, wherein the SIR target is adjusted with a first down step and a first up step in die fast mode and with a second down step and a second up step in the second mode, the first down step being larger than the second down step, the second down step and the second up step being determined based on a target block error rate (BLER) for the data transmission, the SIR target being adjusted based on cyclic redundancy cheek (CRC) of the received data blocks in both the first and second modes, and the SIR target being adjusted by the second up step for erased data blocks and by the second down step for good data blocks in the second mode.

43. The method of claim 42, further comprising:
 maintaining the SIR target fixed during a third mode; and
 transitioning from the third mode to the first mode after a particular time duration.

44. The method of claim 42, further comprising:
 starting in a third mode at beginning of the data transmission; and
 transitioning from the third mode to the first mode.

45. The method of claim 44, further comprising:
 maintaining the SIR target fixed while in the third mode.

46. The method of claim 42, further comprising:
 determining an initial value based on at least one parameter value for the data transmission; and
 setting the SIR target to the initial value at start of the first mode.

47. The method of claim 42, wherein the exit condition for the first mode is a particular number of data blocks received in error.

48. The method of claim 42, wherein the first mode includes at least two stages, each stage being associated with a respective down step that is larger than the second down step anti different from down steps of other ones of the at least two stages.

49. The method of claim 48, wherein the transitioning from the first mode to the second mode comprises transitioning through the at least two stages in the first mode, one stage at a time, from a first stage associated with a largest down step to a last stage associated with a smallest down step.

50. The method of claim 42, further comprising:

increasing the SIR target by a particular amount upon transitioning from the first mode to the second mode.

51. The method of claim 50, further comprising:

determining the particular amount based on an expected difference between an SIR value needed to achieve the target BLER for the data transmission and the SIR target at the time of transition from the first mode to the second mode.

52. The method of claim 42, further comprising:

receiving the data transmission via a plurality of transport channels.

53. The method of claim 52, wherein the adjusting the SIR target using the first mode comprises maintaining a single SIR target for all of the transport channels while in the first mode.

54. The method of claim 52, wherein the adjusting the SIR target using the second mode comprises maintaining a separate SIR target for each of the plurality of transport channels in the second mode, and determining the SIR target used for power control of the data transmission based on separate SIR targets for the plurality of transport channels.

55. The method of claim 54, wherein the SIR target used for power control of the data transmission is set to a highest SIR target among the separate SIR targets for the plurality of transport channels.

56. The method of claim 54, wherein the SIR target used for power control of the data transmission is limited to a value equal to a lowest SIR target among the separate SIR targets for the plurality of transport channels plus a particular SIR offset.

57. A computer-readable medium encoded with a computer program for a wireless communication device, comprising:

instructions for adjusting a signal quality (SIR) target using a first mode at beginning of a data transmission wherein the SIR target is adjusted based on status of data blocks received for the data transmission;

instructions for transitioning from the first mode to a second mode upon encountering an exit condition; and instructions for adjusting the SIR target using only the second mode for remainder of the data transmission, wherein the SIR target is adjusted with a first down step and a first up step in the first mode and with a second down step and a second up step in the second mode, the first down step being larger than the second down step, the second down step and the second up step being determined based on a target block error rate (BLER) for the data transmission, the SIR target being adjusted based on cyclic redundancy check (CRC) of the received data blocks in both the first and second modes, and the SIR target being adjusted by the second up step for erased data blocks and by the second down step for good data blocks in the second mode.

* * * * *